Jan. 7, 1930.   E. O. HILLER ET AL   1,743,062
METHOD OF AND APPARATUS FOR DISTRIBUTING ARTICLES
Filed Sept. 9, 1926   2 Sheets-Sheet 2
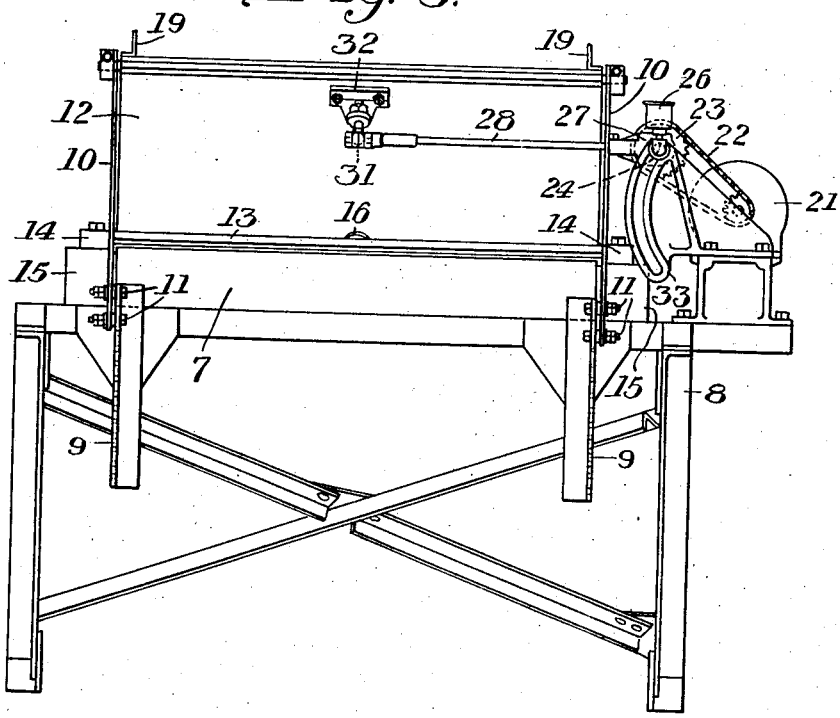
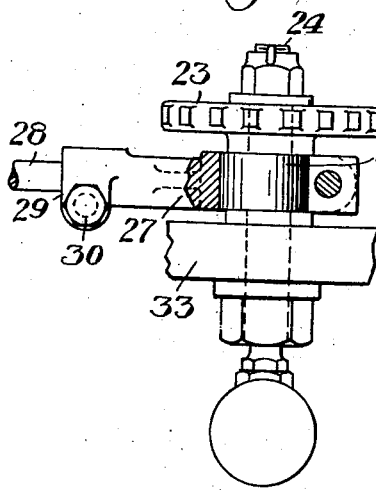
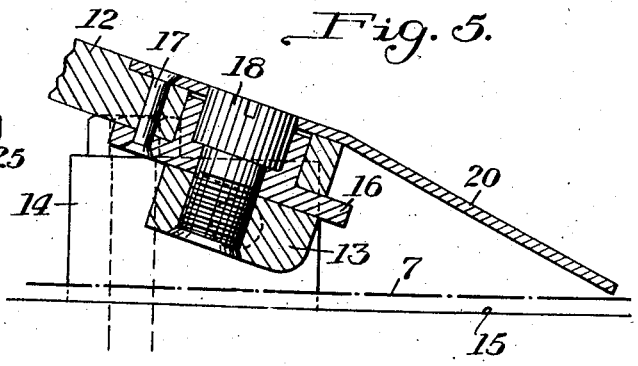
INVENTORS
EVERETT O. HILLER AND
EDWARD H. LORENZ
By Robrow D Brown,
Attorney Patented Jan. 7, 1930

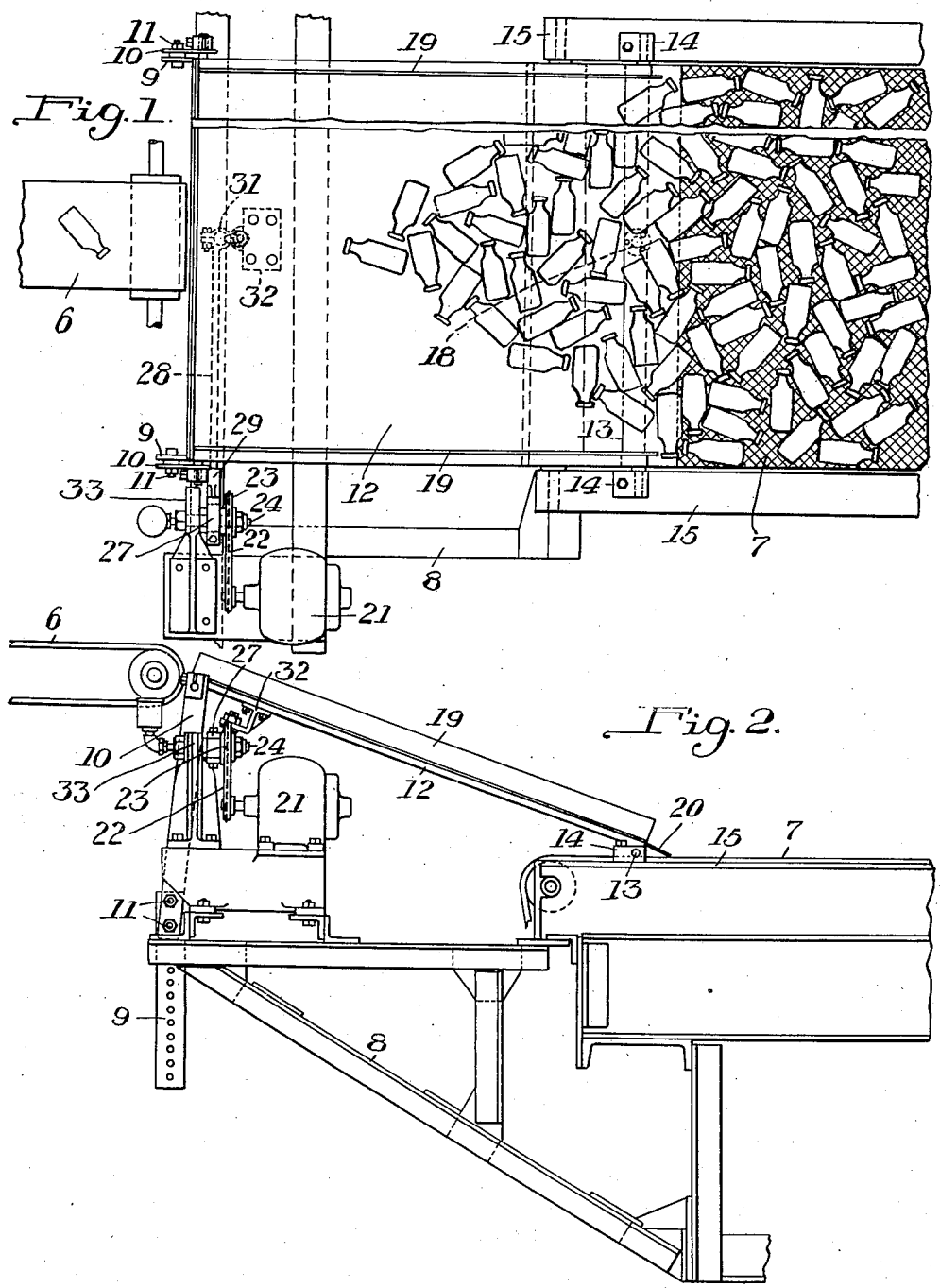

1,743,062

UNITED STATES PATENT OFFICE

EVERETT O. HILLER, OF HARTFORD, AND EDWARD H. LORENZ, OF WEST HARTFORD, CONNECTICUT, ASSIGNORS TO HARTFORD-EMPIRE COMPANY, OF HARTFORD, CONNECTICUT, A CORPORATION OF DELAWARE

METHOD OF AND APPARATUS FOR DISTRIBUTING ARTICLES

Application filed September 9, 1926. Serial No. 134,526.

Our invention relates to a method and apparatus for distributing articles. It is especially useful in charging small glassware into a lehr, without regularly setting up the bottles or other articles, but it is also suitable for employment in various other relations.

One object of our invention is to provide means for advancing and uniformly distributing articles that are delivered singly or in the form of a stream, this object being accomplished by depositing the articles upon a table which is preferably inclined at an angle less than the angle of repose and which is vibrated to minimize frictional contact between the articles and the table sufficiently to cause the articles to slide downwardly under the action of gravity to a delivery station which, in the present instance, is the conveyor 7 of a lehr. The movement of the conveyor is relatively slow compared to that of the articles so that the articles collect adjacent to the bottom of the vibrating table to such an extent that the succeeding articles delivered to the table spread laterally through engagement with the preceding articles. The result is that by the time the articles reach the bottom of the table, they are delivered to the conveyor substantially uniformly transversely thereof.

Another object of our invention is to provide an improved and simplified means and method for handling and transferring articles of various kinds.

One means by which our invention may be practiced is shown in the accompanying drawing, wherein Figure 1 is a plan view of distributing mechanism;

Fig. 2 is a side elevational view thereof;

Fig. 3 is an elevational view, looking forwardly of the distributor apron of Fig. 2;

Fig. 4 is an enlarged view, partially in plan and partially in section, of a portion of the apparatus of Fig. 3; and Fig. 5 is a longitudinal sectional view, on an enlarged scale, of the forward portion of the apron and the supporting structure therefor.

In the drawings there is shown apparatus for receiving bottles from a buck or conveyor 6, which delivers bottles from a shaping machine or other source (not shown), and distributing them upon a lehr conveyor 7 to be carried into a lehr (not shown). The apparatus includes a frame work 8 having vertically disposed perforated supports 9 to which flexible bars 10 may be adjustably connected by means of bolts 11, to vary the height at which the upper edge of an inclined apron or table 12 may be positioned relative to the conveyor 6. The bars 10 support the upper edge of the table and are flexible, so as to permit the table to be moved laterally by a mechanism which will be hereinafter described. The apron 12 may be made of sheet material having low heat-conductivity, such as asbestos board or the like, to reduce the chilling of the bottles while they pass over the apron.

The lower or forward edge of the table 12 rests upon a bar 13, the ends of which are journaled in bearings 14 that are supported upon a conveyor frame 15, so that the lower edge of the table will have pivotal movement in the bearings 14 when the rear edge of the table is raised or lowered. A washer or spacer 16 is interposed between the bar 13 and the table and is secured to the table by rivets 17. A pivot bolt 18 extends through the spacer 16 and into the bar 13 so that the table will have swivelling movement with respect to the bar 13 when the upper edge of the table is vibrated laterally.

Angle bars 19 are secured to the edges of the table, to prevent the glassware falling off the table, and a plate 20 of sheet metal or of non-metallic sheet material, such as that composing the table, is secured to the forward edge of the table to serve as a slideway for the bottles as they pass from the table to the lehr belt 7. The plate 20 may be bent so that its lower edge will have properly spaced relation to the conveyor 7.

Reciprocation of the upper edge of the table is effected by an electric motor 21 that drives a sprocket chain 22, which has driving engagement with a sprocket wheel 23. The sprocket wheel 23 has an eccentric hub portion 25 which has driving connection with an eccentric yoke 27 that is in turn connected to an eccentric rod 28, through the medium of a split socket 29 in which the rod 28 may be adjustably positioned and secured in place by a screw 30.

The rod 28 is provided with a socket on its outer end, for the reception of a ball 31 that forms the head of a bolt which is secured to a bracket 32. The bracket 32 is bolted to the under side of the table 12, so that as the motor 21 effects reciprocation of the eccentric rod 28, the upper edge of the table is reciprocated laterally, such movement being permitted by the flexible bars 10.

The bearing for the shaft 24 which supports the sprocket 23 is vertically adjustable in an arcuately slotted bracket 33, so that when the table is adjusted vertically, thus changing the vertical position of the outer end of the rod 28, the shaft 24 to which the inner end of the rod 28 is connected may be correspondingly adjusted.

The table is preferably vibrated at a high rate of speed, and this speed may be varied in any desired degree, to suit conditions. Furthermore, the length of stroke of the eccentric rod 28 may be varied, as by employing eccentrics of different throws, or by employing an eccentric whose effective radius may be changed.

In operation, the articles are delivered from the buck or conveyor 6 to the table 12. This table is preferably disposed at an angle within the angle of repose of the articles delivered thereto so that friction between the articles and the table will prevent them from sliding downwardly thereon under the action of gravity, if the table is at rest. The vibration of the table, however, breaks the frictional engagement at rapidly recurring intervals so that gravity will cause the articles to slide down the table but at a slower and more uniform rate than would be the case if the table were disposed at an angle at which the articles would slide downwardly with an accelerating velocity under the action of gravity alone.

This slow downward travel of the articles on the table 12, together with the relatively slower movement of the lehr conveyor, causes the articles to collect or bank up adjacent to the lower edge of the table, with the result that the succeeding articles are deflected laterally in both directions by the more slowly moving preceding articles, forming a substantially wedge-shaped stack on the table as is illustrated in Fig. 1

In the event that the conveyor removes more of the articles from one side of the table than from the other, the angle of the side of the stack of articles thereon will become more acute on such side with the result that the articles at the apex of the stack, as well as articles subsequently delivered to the table, will follow the line of least resistance, and will slide down the side of the stack toward the side of the table from which the excess quantity of articles was removed, thus automatically replenishing the supply of articles at that side and maintaining a uniform distribution of the articles throughout the width of the lower edge of the table.

This lateral distribution of the articles on the table insures that they will be delivered to the lehr conveyor uniformly throughout the entire width thereof, thereby utilizing practically all of the available space thereon and tending toward more uniform heat conditions caused by the even spacing of the articles during their passage through the lehr tunnel.

It may be desirable under certain conditions to periodically interrupt frictional contact between the articles and the table by either vibrating the table vertically or by reciprocating it bodily either laterally or longitudinally. It is believed to be preferable, however, to effect such vibration by oscillating the table about a pivot located adjacent to the lower edge thereof, as heretofore described. The reasons for this preference are that if the table is vibrated vertically the articles are jolted against both the table and each other; if the table is reciprocated bodily in a lateral direction the articles intermittently collide with the side walls of the table and, in addition, those at the lower end of the table slide against or scour those previously deposited on the lehr conveyor; and if the table is reciprocated longitudinally the articles on the table not only collide with one another but those at the lower end thereof hammer against the articles previously deposited on the lehr conveyor, with the resulting possibility of marking or otherwise injuring the ware.

The disadvantages above mentioned are minimized by oscillating the table about a pivot located adjacent to the lower edge thereof, as herein shown and described, but it is not intended to limit the invention in this respect.

The capacity of the belt can be still further increased, if the forward edge of the slide or apron 20 is bent up a distance above the lehr conveyor slightly greater than the thickness of a bottle, so that two layers of bottles will be placed upon the conveyor. The lehr belt ordinarily moves quite slowly and the bottles composing the second layer would be deposited upon the bottles already on the belt before the bottles first deposited have been carried by the belt any considerable distance from the forward edge of the apron.

A small amplitude of movement, perhaps as small as 1/8 inch, will be sufficient, in many instances, to reduce frictional contact between the articles and the table so as to cause the articles to move along the table or slide at the proper rate.

This apparatus may also be employed for regularly setting up in a lehr certain classes of articles having considerable width in proportion to their height, such as tumblers and short bottles.

Variations in the construction shown herein may be made without departing from our invention as set forth in the appended claims.

What we claim is:

1. The method of advancing a plurality of articles along a support disposed at an angle within the angle of repose of the articles delivered thereto, which comprises vibrating the support to reduce the opposition to movement due to friction between the articles and said support to permit the articles to move longitudinally thereof under the action of gravity and retarding the movement of the preceding articles to cause the succeeding articles to be deflected thereby laterally of said support.

2. Apparatus for distributing articles which comprises a planiform table disposed at an angle within the angle of repose of the articles delivered thereto, means for delivering the articles one by one to the upper end of the table, and means for oscillating said table to reduce the opposition to movement due to frictional contact between said articles and said table to cause said articles to move along said table under the action of gravity and to distribute themselves laterally of the table.

3. Apparatus for distributing articles which comprises an inclined table, means for delivering a series of articles to the upper end of said table, and means for retarding the movement of said articles at the lower end of said table to cause said artitcles to distribute themselves transversely thereof.

4. Apparatus for distributing articles which comprises a table disposed at an angle within the angle of repose of the articles delivered thereto, means for vibrating said table to cause said articles to move therealong under the action of gravity, and means for retarding the movement of said articles at the lower end of said table to cause them to distribute themselves transversely of said table.

5. Apparatus for distributing articles which comprises a table disposed at an angle of repose of the articles delivered thereto, means for vibrating said table in a lateral direction to cause said articles to move therealong under the action of gravity, and means for retarding the movement of said articles at the lower end of said table to cause them to distribute themselves transversely of said table.

6. Apparatus for distributing articles which comprises a table disposed at an angle within the angle of repose of the articles delivered thereto, means for oscillating said table about a point of support to reduce the opposition to movement due to frictional contact between said articles and said table to cause said articles to move along said table under the action of gravity, and means for retarding the movement of the preceding articles to cause them to deflect the succeeding articles transversely of said table.

7. Apparatus for distributing articles comprising a planiform table disposed at an angle within the angle of repose of the articles delivered thereto and pivotally mounted at the lower end thereof, and means for oscillating said table about its pivot to reduce opposition to movement due to frictional contact between the articles and said support to cause the articles to move therealong under the action of gravity and to distribute themselves laterally over the table.

8. In combination with a buck or conveyor and a lehr, a table mounted intermediate thereof for transferring articles of glassware from the former to the latter, and disposed at an angle within the angle of repose of the articles delivered thereto, means for vibrating said table to reduce the opposition to movement due to friction between are articles and said table to cause said articles to advance at a uniform rate therealong, and means for retarding the rate of movement of the preceding articles to cause the succeeding articles to distribute laterally of said table through engagement therewith.

9. Apparatus for distributing articles, comprising an inclined table, a flexible support secured to the upper edge of the table, a substantially vertically disposed pivotal support for the lower edge of said table, and means for effecting lateral vibration of said upper edge.

10. Apparatus for distributing articles, comprising an inclined table for receiving the articles at a single point at its upper edge, distributing the articles laterally and discharging them at its lower edge, means for effecting lateral movement of the upper portion of said table, and means for supporting the lower portion of the table upon a pivot perpendicularly disposed relative to the table.

11. Apparatus for distributing articles, comprising an inclined table for receiving the articles at its upper edge and discharging them at its lower edge, means for effecting lateral movement of the table at its upper edge, means for effecting vertical adjustment of said upper edge, and means for supporting the lower edge of the table for pivotal movements in vertical and horizontal planes.

12. The method of stacking glass articles within a lehr which comprises placing the glass articles one by one upon the upper portion of a support disposed adjacent the lehr and at an angle within the angle of repose of the articles and oscillating said support in the plane of the surface thereof to distribute the articles laterally of the support and to advance the articles to the lower end of said support and onto and across the lehr.

13. In combination, a buck for conveying a series of glass articles one by one to a receiving station, a lehr, a conveyor within said lehr, and means for transferring glassware from said buck to the said lehr, said means comprising a planiform support of greater width than the buck placed between said buck and said lehr and disposed at an angle less than the angle of repose of glassware to be transferred and means for oscillating said support to cause the said glassware to move from the receiving station laterally of the support and toward and onto the lehr conveyor under the influence of gravity.

Signed at Hartford, Connecticut, this 8th day of September, 1926.

EVERETT O. HILLER.
EDWARD H. LORENZ.